United States Patent [19]
Raque

[11] Patent Number: 5,697,490
[45] Date of Patent: Dec. 16, 1997

[54] CLAMSHELL CARRIER

[75] Inventor: Glen Raque, Louisville, Ky.

[73] Assignee: Raque Food Systems, Inc., Louisville, Ky.

[21] Appl. No.: 515,160

[22] Filed: Aug. 15, 1995

[51] Int. Cl.$^6$ .................................................. B65G 25/00
[52] U.S. Cl. ........................... 198/803.9; 198/803.7; 198/470.1; 53/300; 53/329.4
[58] Field of Search ........................... 198/469.1, 470.1, 198/474.1, 476.1, 803.7, 803.9; 53/300, 329.3, 329.4, 374.3, 374.2, 371.2; 493/453, 176–179

[56] References Cited

U.S. PATENT DOCUMENTS

| | | | |
|---|---|---|---|
| 371,493 | 10/1887 | Dolan | 198/803.9 |
| 1,974,165 | 9/1934 | Stage | 493/453 |
| 2,938,620 | 5/1960 | Waters | 198/803.9 |
| 3,087,596 | 4/1963 | Fulton | 198/803.7 |
| 3,817,816 | 6/1974 | Watt | 53/300 |
| 4,164,391 | 8/1979 | Howard et al. | 198/803.7 |
| 4,425,996 | 1/1984 | Hoffmann | 198/803.7 |
| 4,432,745 | 2/1984 | Eldridge | 493/453 |
| 4,490,961 | 1/1985 | Raque | |
| 4,629,445 | 12/1986 | Toriyama | 493/453 |
| 4,715,846 | 12/1987 | Zak | 493/453 |
| 4,747,813 | 5/1988 | Genoud et al. | 493/177 |
| 4,757,890 | 7/1988 | Motoda | 198/345.3 |
| 4,791,775 | 12/1988 | Raque et al. | |
| 4,860,439 | 8/1989 | Riley | 198/345.1 |
| 4,991,375 | 2/1991 | Raque et al. | |
| 5,096,052 | 3/1992 | Raque et al. | |
| 5,345,747 | 9/1994 | Raque et al. | |

FOREIGN PATENT DOCUMENTS

| | | | |
|---|---|---|---|
| 0009262 | 1/1977 | Japan | 198/803.7 |
| 396743 | 1/1966 | Switzerland | 198/803.7 |
| 449478 | 11/1974 | U.S.S.R. | 198/803.9 |
| 512134 | 4/1976 | U.S.S.R. | 198/803.7 |

*Primary Examiner*—William E. Terrell
*Assistant Examiner*—Khoi H. Tran
*Attorney, Agent, or Firm*—Bose McKinney & Evans

[57] ABSTRACT

A carrier secures articles while the carrier is drawn by a carrier transport mechanism of a conveyor system along a series of stations adjacent to processing equipment that can perform operations on the article. The carrier has a base and one or two arms that are attached to the base at one end. The other ends of the arms supports walls. The arms move relative to the carrier base between an article-engaging position where the walls prevent the article from moving off the carrier base to a down-out-of-the-way position where the walls lie below the carrier base allowing movement of the article on or off the carrier base. Wheels are attached to the ends of the arms supporting the walls and a wheel guide track attached to the conveyer system moves the arms between the article-engaging position and the down-out-of-the-way position at desired points along the conveyer system.

35 Claims, 5 Drawing Sheets

CLAMSHELL CARRIER

BACKGROUND AND SUMMARY OF THE INVENTION

The present invention relates to processing equipment, and particularly to a clamshell carrier that is part of a conveyor system for use with food processing equipment. More particularly, the present invention relates to a carrier that secures articles while the carrier is drawn by a carrier transport mechanism of the conveyor system across a series of stations adjacent to food processing equipment that can perform operations on the articles, the carrier being configured to secure both articles having regular shapes and articles having irregular shapes.

Automated food processing equipment systems typically include carriers that are configured to secure articles such as food containers as the carriers are moved to positions near stations having equipment that performs various operations on the articles. These carriers are well-suited for securing and transporting articles having regular shapes. Occasionally, it is desirable to market a product that is irregularly shaped. What is needed is a carrier that can secure both regularly shaped articles and irregularly shaped articles while carrying the articles as the carrier is drawn by a carrier transport mechanism through a conveyor system and while automated equipment performs operations on the articles. The carrier needs to consistently hold the articles in the desired orientation relative to the equipment without dropping the articles as operations are performed on the articles by the equipment.

According to the present invention, a carrier is provided for transporting an article, such as a container for food, on a carrier transport mechanism of a conveyor system. The carrier includes a base having two opposing sides and an upwardly-facing top surface that defines a plane. The article is carried by the top surface of the base. The carrier further includes an end or wall having a top surface, and means coupled to the base for supporting the wall for movement relative to the base between an article-engaging position having the top surface of the wall positioned to lie above the plane defined by the top surface of the base, and a down-out-of-the-way position in which the top of the wall is positioned to lie below the plane defined by the top surface of the base. In this down-out-of-the-way position, the wall does not obstruct access to the top surface of the base.

In preferred embodiments, the base is an elongated plate having two longitudinal sides and two transverse ends therebetween. The carrier includes an article-restrainer assembly having two opposing walls that are coupled to the base for movement to a first position adjacent to the article to restrain movement of the article past the sides of the base and a second position away from the article.

Typically, each wall is appended to an arm having an inner end that is pivotably connected to two pivot blocks. The walls are appended to outer ends of each arm and extend upwardly therefrom. The arms move together between a down-out-of-the-way position having the tops of the walls below the top surface of the base and an article-engaging position having the walls adjacent to the sides of the base and the tops of the walls positioned above the top surface of the base. As the arms move from the down-out-of-the-way position to the article-engaging position, the walls effectively envelope the base. This movement of the arms provides the carrier with a clamshell appearance when viewed from the side, especially as the arms close, moving upwardly together to the article-engaging position enveloping the base, and as the arms open, moving downwardly together to the down-out-of-the-way position exposing the base.

The conveyor system can be provided with a plurality of carriers. Each carrier cooperates with the carrier transport mechanism of the conveyor system to transport articles carried on the base of the carrier through the conveyor system to stations that perform operations.

The carrier transport mechanism includes two spaced-apart parallel endless chains and two sprocket assemblies positioned to lie adjacent to the extreme ends of the carrier transport mechanism. Each sprocket assembly has an axle lying on an axis that is perpendicular to the carrier chains and each carrier chain engages one sprocket on each sprocket assembly. The carrier chains have links that are formed to include openings that mesh with teeth formed on the sprockets. An axle of one of the sprocket assemblies is connected to a drive motor that rotates the axle, and the carrier chains move as the result of the meshing engagement of the links of the carrier chains with the teeth of the sprockets that are driven by the rotating axle.

The carrier chains and the sprocket assemblies are arranged so that each carrier chain includes an upper run that passes across the equipment and a lower run that passes below the upper run and operates to return links of the carrier chain to the upper run. The upper runs translate in a first direction between the sprocket assemblies from a tail shaft assembly to a head shaft assembly. The carriers are connected to the carrier chains so that carriers on the upper runs translate in the first direction across the equipment. The operations are performed on articles carried by carriers on the upper runs. The longitudinal side of the base facing the head shaft assembly when the carrier is on the upper runs is the leading side and the pivot arm adjacent to the leading side is the leading arm. The opposing pivot arm is the trailing arm. The lower runs of the carrier chains translate in a direction opposite the direction that the upper runs translate and carriers on the lower runs are returned to a starting position on the upper runs.

Each carrier includes chain attachment blocks that interconnect the carrier to the chains. One chain attachment block is positioned to lie on each end of the base. In addition, each pivot arm is pivotably connected to two pivot attachment blocks and each pivot attachment block is connected to a chain attachment block. The leading arm pivots about a first pivot axis, the trailing arm pivots about a second pivot axis, and the first pivot axis is spaced apart from and parallel to the second pivot axis. A gear mechanism is formed on each of the arms and the gear mechanism of the leading arm engages the gear mechanism of the trailing arm so that the pivot arms pivot at the same time and to the same extent. In addition, followers are connected to the leading arm and engage the pivot attachment block when the arm is pivoted downwardly to stop the downward pivoting movement of both of the arms at the down-out-of-the-way position.

Each pivot arm is provided with a cam wheel that is rotatably connected to the outer end of each arm. The conveyor system includes two wheel guide tracks positioned to lie between the upper and lower runs of the carrier chains and at positions between the head shaft assembly and the tail shaft assembly. The wheel guide tracks are positioned so that a vertical gap is formed between the upper runs and the wheel guide tracks. The cam wheels engage the wheel guide tracks as carriers connected to the upper runs translate between the sprocket assemblies.

The size of the vertical gap varies along the length of the upper runs. At positions along the upper runs having no wheel guide tracks or having large vertical gaps between the wheel guide tracks and the upper runs the arms assume the down-out-of-the-way position. At positions with small vertical gaps the arms assume the upward article-engaging position. The wheel guide tracks typically include ramps between positions with large vertical gaps and positions with small vertical gaps so that transitions of the arms between the down-out-of-the-way position and the article-engaging position are gradual.

As carriers translate from a position having a large vertical gap to a position with a small vertical gap, engagement of the cam wheels with the ramps of the wheel guide tracks cause the arms to close, gradually moving from the down-out-of-the-way position to the article-engaging position. Likewise, as carriers translate from a position having a small gap to a position having a large gap, engagement of the cam wheels with the ramps of the wheel guide tracks causes the arms to open, gradually moving from the article-engaging position to the down-out-of-the-way position. Thus, the movement and positions of the arms and walls relative to the base are a function of the size of the vertical gap between the upper runs and the wheel guide tracks, and the wheel guide tracks can be arranged relative to the upper runs so that the arms of each carrier assume a desired position at each point along the conveyor system.

There are no wheel guide tracks beneath the upper runs at the starting position so that the walls of a carrier at the starting position are in the down-out-of-the-way position, having the tops of the walls below the plane defined by the top surface of the base of the carrier. Access to the top surface of the base, unobstructed by the walls, is achieved when the arms are in the down-out-of-the-way position so that an article can be swept onto the top surface of the base, for instance by a standard overhead sweep mechanism. Advantageously, having the tops of the walls below the plane defined by the top surface of the base allows the sweep mechanism to engage only the bottom of the article being swept onto the base and to hold the article in a horizontal position during the sweep-in operation.

Once the article is resting on the top surface of the base, the conveyor system draws the carrier from a portion of the conveyor system having a large gap between the wheel guide tracks and the upper runs to a portion of the conveyor system having a small gap between the wheel guide tracks and the upper runs. As the carrier moves between these positions, the arms and walls pivot upwardly to the article-engaging position. In the article-engaging position, the walls envelope the sides of the base and engage the article so that the carrier securely holds even an odd-shaped article, thereby allowing operations to be preformed on the article.

Once the operations are complete, the carrier is drawn to a portion of the conveyor system having a large gap between the wheel guide tracks and the conveyor system. As the carrier moves into this position, the arms and walls pivot downwardly to the down-out-of-the-way position so that the article can be swept out of the machine and moved to the next operation. The carrier is then pulled by the carrier chains around the head shaft assembly, across the lower runs toward the tail shaft assembly, around the tail shaft assembly, and back to the starting position.

Additional objects, features and advantages of the invention will become apparent to those skilled in the art upon consideration of the following detailed description of a preferred embodiment exemplifying the best mode of carrying out the invention as presently perceived.

BRIEF DESCRIPTION OF THE DRAWING

The detailed description refers particularly to the accompanying drawing figures in which.

DETAILED DESCRIPTION OF THE INVENTION

Figure 1:
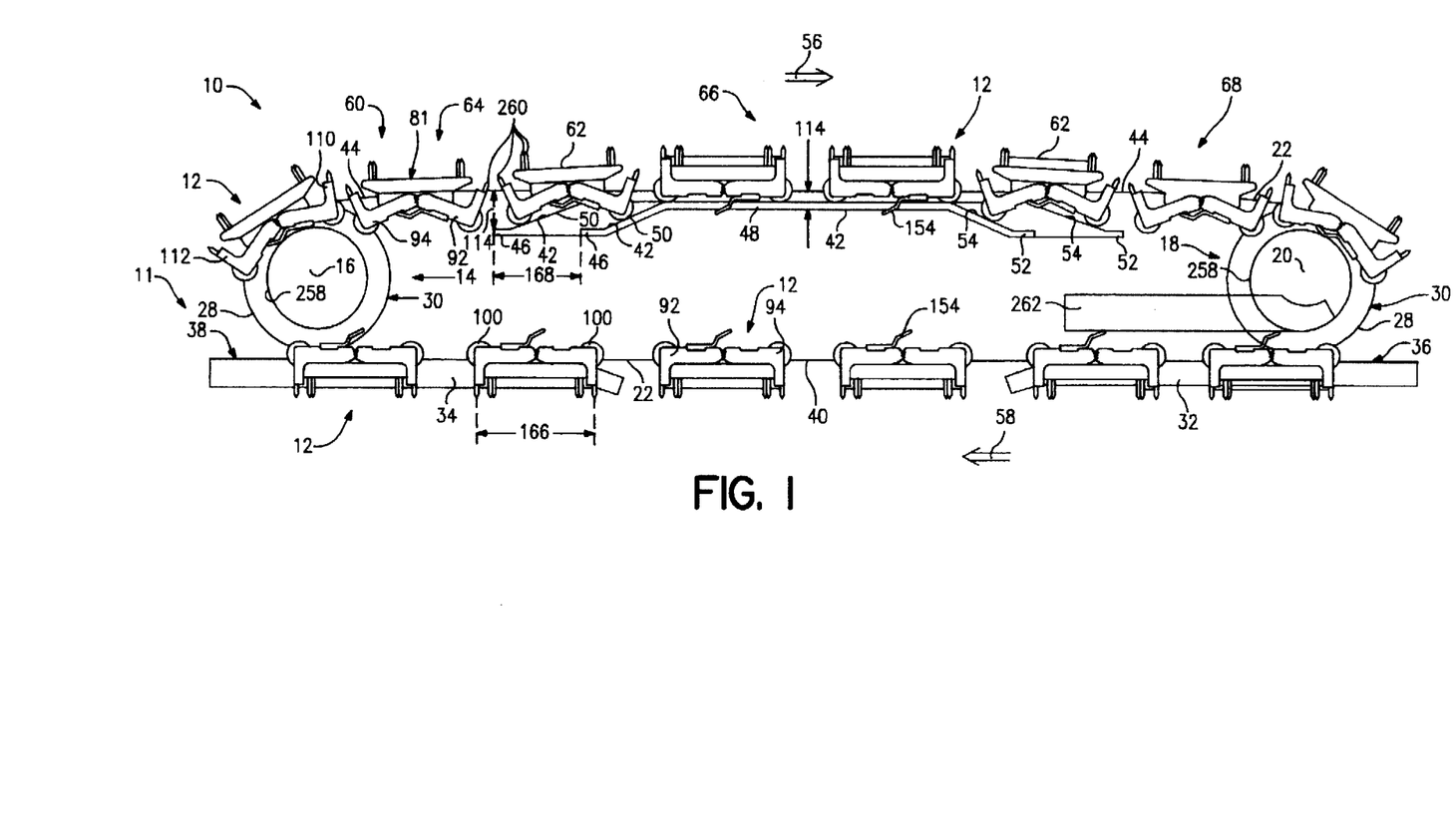
FIG. 1 is a diagrammatic illustration of a conveyor system for use with processing equipment showing an elongated carrier transport mechanism having a tail shaft on one end, a head shaft on the other end, carrier chains encircling both of the tail shaft and the head shaft and having upper runs of carrier chains between the tail shaft and the head shaft and lower runs of carrier chains positioned to lie beneath the upper runs of carrier chains, a plurality of carriers spaced apart along the carrier chains, and elongated wheel guide tracks positioned to lie beneath the upper runs and between the tail shaft and the head shaft.

An illustrative conveyor system 10 for transporting carriers 12 in accordance with the present invention is shown in FIG. 1. Conveyor system 10 includes a frame (not shown), a carrier-transport mechanism 11 supported by the frame, and carriers 12 that are coupled to carrier transport mechanism 11 and that are transported by carrier transport mechanism 11 through conveyor system 10. Carrier transport mechanism 11 includes two spaced-apart parallel endless carrier chains 22. Several carriers 12 can be coupled to carrier chains 22.

Carrier chains 22 define parallel circuits, each starting at a starting position 60 above a tail shaft assembly 14, moving horizontally in a direction 56 to a head shaft assembly 18 and wrapping around head shaft assembly 18, moving horizontally in a direction 58 back to tail shaft assembly 14 and wrapping around tail shaft assembly 14, and moving back to starting position 60. Carrier chains 22 include upper runs 44 and lower runs 40 positioned to lie beneath upper runs 44 as shown in FIG. 1.

Figure 2:
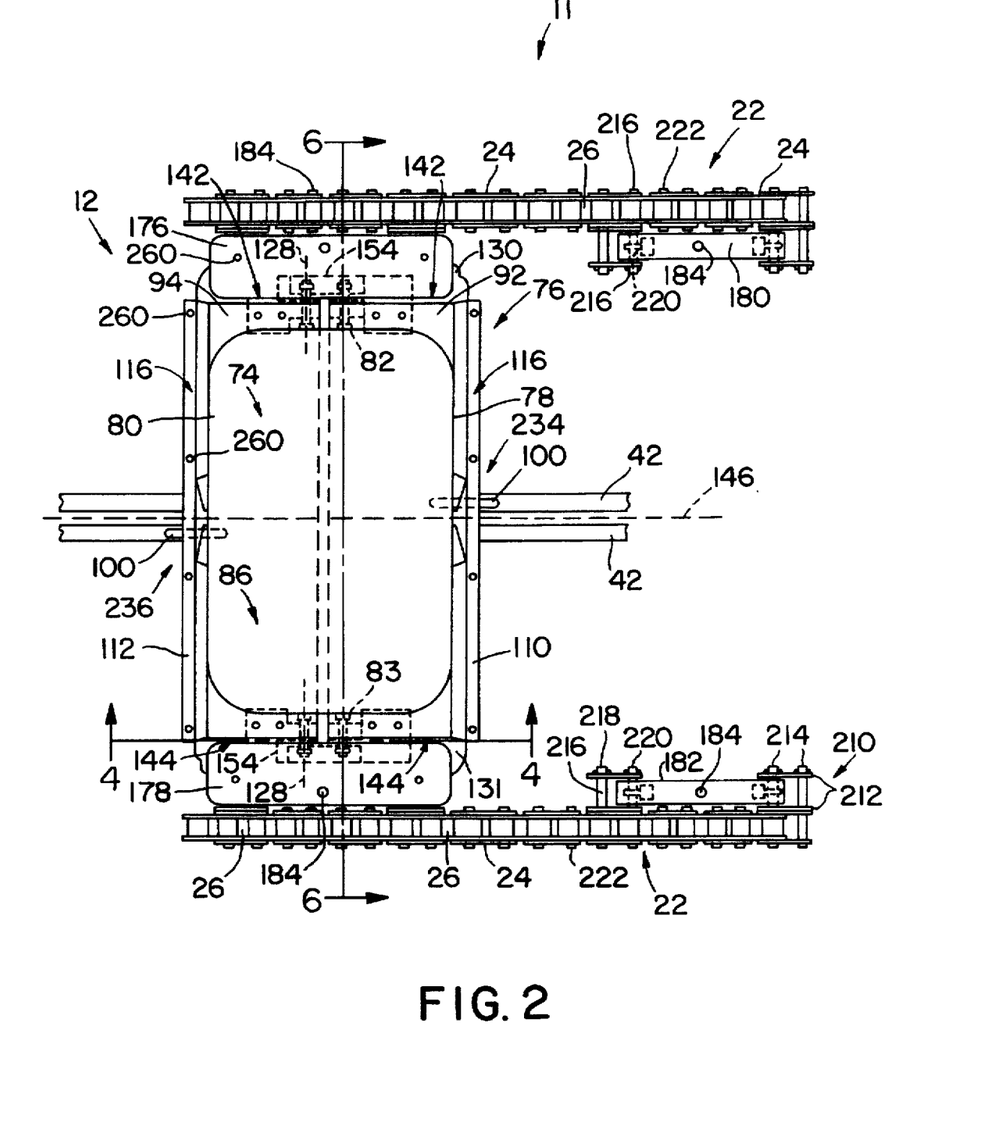
FIG. 2 is a plan view of one of the carriers of FIG. 1 positioned on the carrier transport mechanism showing two ends of the carrier, each end being connected to a carrier chain, and the top surface of the elongated base positioned to lie between two longitudinal walls that are in the article-engaging position engaging longitudinal sides of the base.

Carrier chains 22 include linkages 24 that are pulled along the path defined by carrier chains 22 as shown in FIG. 2.

Carriers 12 are mounted to linkages 24 and articles 62, such as containers for food, are carried by carriers 12 when carriers 12 are positioned on upper runs 44 as shown in FIG. 1. Movement of linkages 24 along the path defined by carrier chains 22 draws carriers 12 along the same path, thereby drawing articles 62 carried by carriers 12 through sections of conveyor system 10 including an operating section 66 in which operations are performed on articles 62, typically by automated equipment (not shown).

Figure 4:
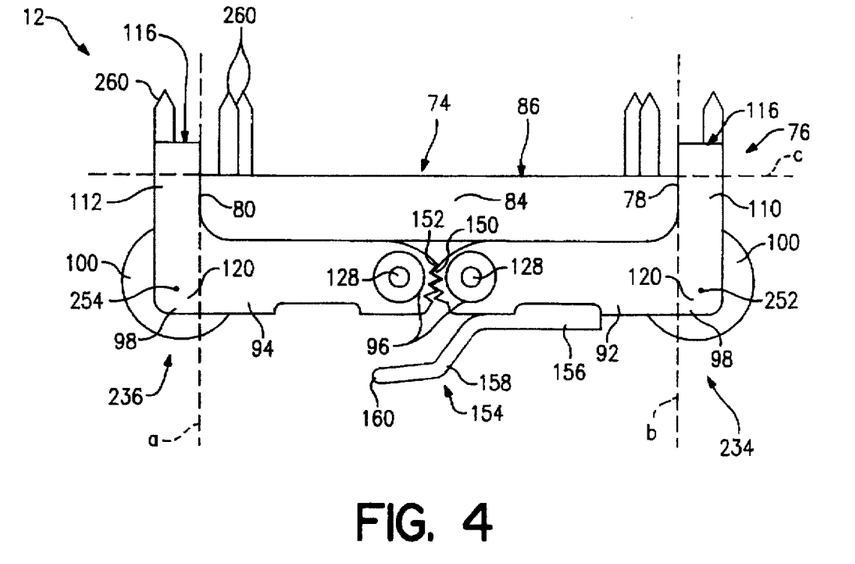
FIG. 4 is a view taken along line 4—4 of FIG. 2 showing the pivotable arms beneath the flat base and the upwardly extending walls appended to outer ends of the arms, the arms and walls in the article-engaging position having the tops of both walls lying above the top surface of the base, and the arms having interlocking teeth so that the arms and walls move together between the article-engaging position and a down-out-of-the-way position.
Figure 5:
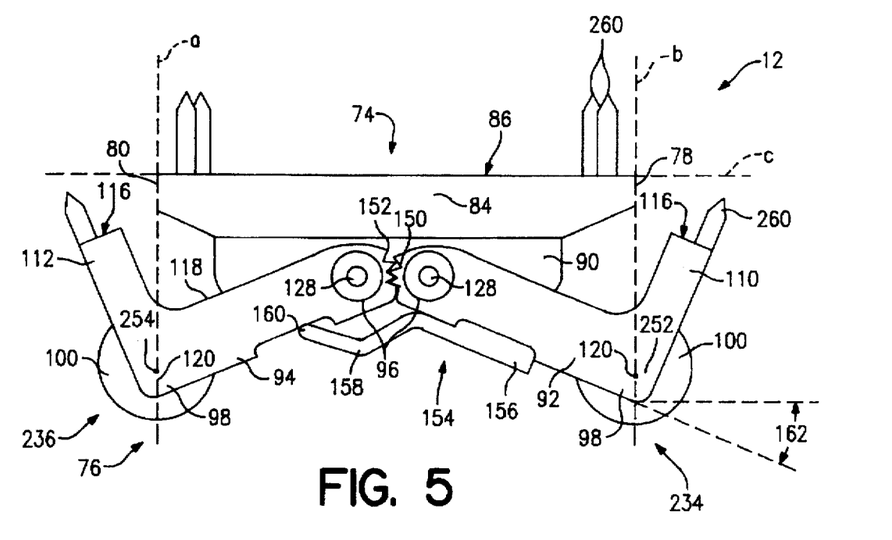
FIG. 5 is a view similar to FIG. 4 showing the arms and walls in the down-out-of-the-way position wherein the tops of the walls are positioned to lie beneath the top surface of the base and the arms are pivoted downwardly away from the underside of the base.

Each carrier 12 includes a base 74 having sides 78, 80 and an article-restrainer assembly 76 that can be moved into a position to restrain the movement past sides 78, 80 of base 74 of article 62 carried on base 74, as shown best in FIGS. 4 and 5. Article-retainer assembly 76 includes arms 92, 94 that are pivotably mounted to base 74 as shown in FIGS. 1 and 4–6. Article-retainer assembly 76 further includes cam wheels 100 rotatably mounted to distal portions 98 of arms 92, 94. As carriers 12 are drawn along upper runs 44, elongated wheel guide tracks 42 that are positioned to lie beneath upper runs 44 engage cam wheels 100 which ride on wheel guide tracks 42 as shown in FIGS. 1 and 2.

Wheel guide tracks 42 are part of conveyor system 10 and are fixed relative to the frame (not shown). Wheel guide tracks 42 establish the vertical position of cam wheels 100 relative to upper runs 44. Base 74 is vertically fixed relative to carrier chains 12, so that wheel guide tracks 42 also establish the vertical position of cam wheels 100 relative to base 74. As each carrier 12 is moved by carrier-transport mechanism 11 to a section of conveyor system 11 in which wheel guide tracks 42 are closer to upper runs 30 than in the previous section, cam wheels 100 are moved upwardly closer to base 74 causing arms 92, 94 to move upwardly closer to base 74. Likewise, as each carrier 12 is moved to a section of conveyor system 10 in which wheel guide tracks 42 are father away from upper runs 30 than in the previous section, cam wheels 100 and arms 92, 94 are moved downwardly away from base 74.

Figure 3:
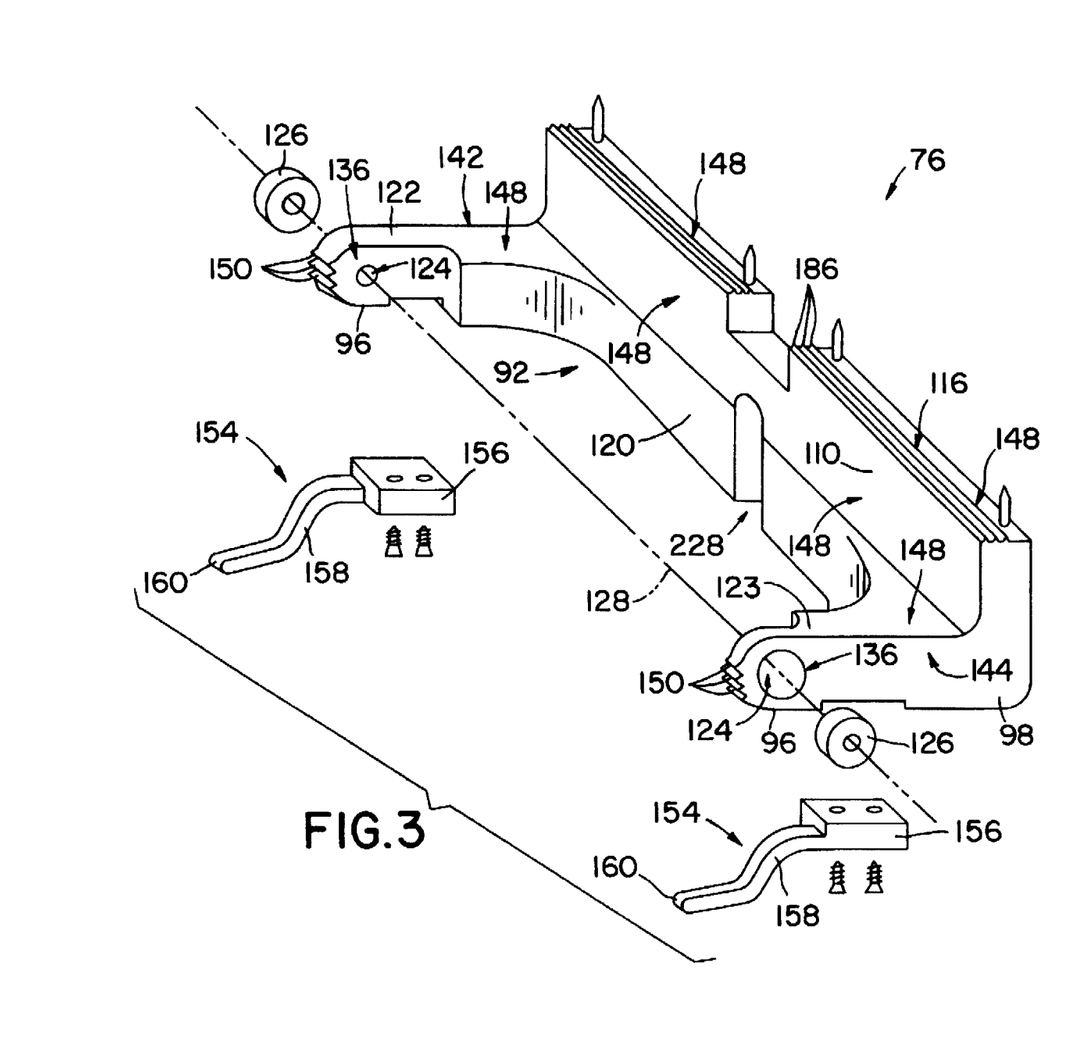
FIG. 3 is an exploded perspective view of a leading arm of an article-restrainer mechanism showing a vertical wall appended to the leading arm and extending upwardly therefrom, followers connected to the bottom of the arm and extending downwardly therefrom, and a cam wheel assembly that is mounted to the rear of the arm.

Article-retainer assembly 76 further includes walls 110, 112 appended to distal portions 98 of arms 92, 94 as shown best in FIGS. 3–5. Walls 110, 112 are movable to an upward position adjacent to sides 78, 80 of base 74 as shown in FIG. 4. If an article 62 is placed onto base 74 at a sweep-in section 64 before walls 110, 112 are moved to the upward position, walls 110, 112 will typically engage article 62 when moved to the upward article-engaging position to secure article 62 on carrier 12 and to restrain movement of article 62 past sides 78, 80 of base 74 as shown in FIG. 1. Typically, an article 62 is on carrier 12 and walls 110, 112 are in the article-engaging position when carrier 12 is in operating section 66.

After passing through operating section 66 of conveyor system 10 and after operations are performed on article 62, carrier 12 is drawn by carrier chains 22 to a sweep-out section 68 of conveyor system 10 as shown in FIG. 1. Wheel guide tracks 42 are arranged in sweep-out section 68 so that cam wheels 100 move downwardly relative to upper runs 44 when carrier 12 is moved into sweep-out section 68. The downward movement of cam wheels 100 results in a corresponding downward movement of arms 92, 94 and walls 110, 112 to a down-out-of-the-way position in which top surfaces 116 of walls 110, 112 are below a plane c defined by top surface 86 of base 74 as shown in FIG. 5. When walls 110, 112 are in the down-out-of-the-way position, walls 110, 112 no longer obstruct access to top surface 86 of base 74 and no longer restrain movement of article 62 past sides 78, 80 of base 74 so that article 62 can be removed from carrier 12. Once article 62 is removed from carrier 12, carrier chains 22 draw carrier 12 around head shaft assembly 18, along lower runs 40 toward tail shaft assembly 14, around tail shaft assembly 14, and back to starting position 60 on upper runs 44.

Carrier transport mechanism 11 includes tail shaft assembly 14, head shaft assembly 18, and two parallel endless carrier chains 22 as shown in FIGS. 1 and 2. Tail shaft assembly 14 and head shaft assembly 18 each include a pair of spaced-apart carrier chain sprockets 28. Each sprocket 28 has radially outwardly extending teeth (not shown) appended to an outer edge 30 of sprocket 28 and each sprocket 28 in each assembly 14, 18 engages a carrier chain 22. Sprockets 28 in each pair of carrier chain sprockets 28 are connected by an axle (not shown). The axles are mounted to carrier transport mechanism 11 for rotation about axes of rotation 16, 20 as shown in FIG. 1.

Carrier chains 22 are assembled from interconnected linkages 24 each of which defines an opening 26 as shown in FIG. 2. Each carrier chain 22 engages carrier chain sprockets 28 so that the teeth (not shown) of carrier chain sprockets 28 are received in openings 26 to provide a driving connection therebetween. Head shaft assembly 18 is coupled to a drive motor (not shown) that causes the axle (not shown) of head shaft assembly 18 to rotate about axis of rotation 20. Carrier chain sprockets 28 are fixed to the axle so that rotation of the axle causes sprockets 28 of head shaft assembly 18 to rotate. The interlocking engagement of the teeth of rotating sprockets 28 of head shaft assembly 18 and carrier chains 22 results in rotating sprockets 28 of head shaft assembly 18 pulling carrier chains 22 and carriers 12 connected thereto around head shaft assembly 18 and around tail shaft assembly 14, as well as causing them to translate therebetween.

Carrier chain return rails 32 are positioned to lie beneath lower runs 40 of carrier chains 22 and between head shaft assembly 18 and tail shaft assembly 14 adjacent to head shaft assembly 18 as shown in FIG. 1. Likewise, carrier chain feed rails 34 are positioned to lie beneath lower runs 40 of carrier chains 22 and between head shaft assembly 18 and tail shaft assembly 14 adjacent to tail shaft assembly 14 as shown in FIG. 1. Carriers 12 engage top surfaces 36 of carrier chain return rails 32 and top surfaces 38 of carrier chain feed rails 34 as carriers 12 move from head shaft assembly 18 to tail shaft assembly 14 on lower runs 40.

Wheel guide tracks 42 are fixed with respect to the frame (not shown) and are vertically positioned to lie between upper runs 44 and lower runs 40, and laterally positioned to lie between tail shaft assembly 14 and head shaft assembly 18 as shown in FIG. 1. Each wheel guide track 42 includes an engaging portion 46 laterally positioned to lie after sweep-in section 64, an upper portion 48 located laterally adjacent to operating section 66, and an upwardly ramping arm-closing portion 50 therebetween. Each wheel guide track 42 further includes a disengaging portion 52 laterally positioned to lie before sweep-out section 68 and a downwardly ramping arm-opening portion 54 positioned to lie between upper portion 48 and disengaging portion 52.

Wheel guide tracks 42 are spaced apart from upper runs 44 to form a vertical gap 114 between upper runs 44 and wheel guide tracks 42. The magnitude of vertical gap 114 varies between lateral positions along conveyor system 10. The magnitude of vertical gap 114 is at a minimum along upper portion 48 that is laterally adjacent to operating section 66 and a maximum adjacent to engaging portion 46 and disengaging portion 52.

Cam wheels 100 are spaced apart from one another a distance 166 as shown in FIG. 1. The wheel guide tracks 42 are longitudinally spaced apart a distance 168 that is equivalent to distance 166 so that cam wheels 100 are supported at equivalent vertical distances from upper runs 44 when carrier 12 is on upper runs 44 even though cam wheels 100 are longitudinally spaced apart.

There are no wheel guide tracks 42 positioned to lie beneath upper runs 44 in sweep-in section 64, as shown in FIG. 1. As a result, arms 92, 94 of each carrier 12 in sweep-in section 64 are in the down-out-of-the-way position. Article 62 is swept onto base 74 of carrier 12 in sweep-in section 64 by a standard overhead sweep mechanism (not shown). Advantageously, since top surfaces 116 of walls 110, 112 are below top surface 86 of base 74 when arms 92, 94 are in the down-out-of-the-way position, article 62 being swept on to base 74 can be supported from the bottom of article 62 by the overhead sweep mechanism and can be held in a horizontal orientation during the transfer from the overhead sweep mechanism to carrier 12. This is particularly advantageous when article 62 is a container for food and the operations performed in operating section 66 relate to packaging containers for food.

After receiving article 62, carrier 12 is drawn by carrier chains 22 to operating section 66 of conveyor system 10. Cam wheels 100 ride along engaging portion 46 of wheel guide tracks 42 as carrier 12 is pulled toward operating section 66. Vertical gap 114 is large at engaging portion 46, but it decreases along upwardly ramping arm-closing portion 50 from engaging portion 46 to upper portion 48. As carrier 12 is drawn between sweep-in section 64 and operating section 66 of conveyor system 10, cam wheels 100 engage arm-closing portion 50 causing arms 92, 94 connected to cam wheels 100 to gradually close, moving upwardly relative to base 74 as carrier 12 is moved by carrier transport mechanism 11 along conveyor system 10 to portions with progressively smaller vertical gap 114.

Vertical gap 114 is small adjacent to operating section 66 so that arms 92, 94 are in the article-engaging position as shown in operating section 66 of conveyor system 10 of FIG. 1 and as shown in FIG. 4. Articles 62 are securely held by carriers 12 when arms 92, 94 are in the article-engaging position and operations can be performed on articles 62 that are held in this manner without the orientation of articles 62 inadvertently changing relative to carriers 12 and without articles 62 falling from carriers 12.

Each carrier 12 is thereafter drawn to sweep-out section 68 of conveyor system 10 as shown in FIG. 1. As carrier 12 is drawn from operating section 66 to sweep-out section 68, cam wheels 100 engage downwardly ramping arm-opening portion 54 of wheel guide tracks 42. Vertical gap 114 increases along arm-opening portion 54 so that cam wheels 100 engaging arm-opening portion 54 gradually move downwardly relative to upper runs 44 and arms 92, 94 gradually open, moving downwardly to the down-out-of-the-way position to expose article 62. There are no wheel guide tracks 42 positioned to lie beneath upper runs 44 in sweep-out section 68. As a result, arms 92, 94 remain in the down-out-of-the-way position when article 62 is swept off of carrier 12 by a standard overhead sweep mechanism (not shown).

After article 62 is swept off of carrier 12, carrier 12 is pulled by carrier chains 22 around carrier chain sprockets 28 on head shaft assembly 18 and into engagement with carrier chain return rails 32. Carriers 12 are pulled along lower runs 40 of carrier chains 22 from head shaft assembly 18 toward tail shaft assembly 14 into engagement with carrier chain feed rails 34, around carrier chain sprockets 28 of tail shaft assembly 14, and back to starting position 60.

Each carrier 12 has a base 74 including a lower base 90 and an upper base 84 appended to lower base 90. Upper base 84 is typically a flat elongated bar having two transverse ends 82, 83, a longitudinal leading side 78 facing head shaft assembly 18 when carrier 12 is on upper runs 44, a longitudinal trailing side 80 opposing leading side 78, and a planar top surface 86.

Each carrier 12 further includes article-retainer assembly 76 having arms 92, 94, walls 110, 112, locator pins 260, cam wheel assemblies 234, 236 including cam wheels 100, and followers 154. A portion of one article-retainer assembly 76 including leading arm 92 and the parts of article-retainer assembly 76 associated with leading arm 92 is shown in FIG. 3. The portions of article-retainer assembly 76 associated with trailing arm 94 are identical to the portion shown in FIG. 3 that is described below, with the exception that there are no followers 154 connected to trailing arm 94.

Leading arm 92 is a flat U-shaped member having a bar 120 defining distal portion 98 of leading arm 92 and positioned to lie adjacent to leading side 78 of base 74 as shown in FIGS. 3–5. Leading arm 92 includes two spaced-apart ends 142, 144 between the proximal portion 96 and the distal portion 98 and the distance between the ends 142, 144 is greater than the distance between proximal portion 96 and distal portion 98 as shown in FIG. 3. Wall 110 is integrally appended to bar 120 and extends upwardly therefrom.

Two spaced-apart prongs 122, 123 are appended to bar 120 and extend inwardly therefrom toward trailing arm 94. Prongs 122, 123 extend in a direction that is perpendicular to wall 110 so that prongs 122, 123 cooperate with wall 110 to form right angles as shown in FIGS. 4 and 5. Proximal portions 96 of prongs 122, 123 include cylindrical openings 124 that define a pivot axis 128 and that receive bearings 126 as shown in FIG. 3.

Distal portion 98 of arm 92 is adjacent to side 78 of base 74 and distal portion 98 of arm 94 is adjacent to side 80 of base 74, as shown in FIGS. 4 and 5. Leading wall 110, appended to distal portion 98 of leading arm 92, is positioned to lie adjacent to leading side 78 when leading arm 92 is in the article-engaging position. Trailing arm 94 has an upwardly-extending trailing wall 112 appended to distal portion 98 of trailing arm 94 positioned to lie adjacent to trailing side 80 when trailing arm 94 is in the article-engaging position. Walls 110, 112 extend upwardly and a top surface 116 of each wall 110, 112 is positioned above top surface 86 of upper base 84 when walls 110, 112 are in the article-engaging position, as shown in FIG. 4.

In addition, cam wheel assemblies 234, 236 are mounted in a cam wheel-receiving space 228 formed on the distal portion 98 of each arm 92, 94 as shown in FIG. 3, which specifically shows leading cam wheel assembly 234. Each cam wheel assembly 234, 236 includes a cam wheel 100 that is formed to include two rims 238 that define a channel 240 therebetween, as shown best in FIG. 6. An o-ring 242 made from a resilient material is received in channel 240. O-ring 242 provides traction for cam wheels 100 against wheel guide tracks 42 to ensure that each cam wheel 100 rotates while engaging wheel guide tracks 42 to minimize drag forces on carrier chains 12 and to minimize wear on cam wheel assemblies 234, 236. Use of o-rings 242 is especially advantageous because contact between cam wheels 100 and wheel guide tracks 42 can result in wear of the contacting surfaces. Interposing soft and easily replaceable o-rings 242 between cam wheels 100 and wheel guide tracks 42 results in wear of the easily replaceable o-rings 242 rather than wear of wheel guide tracks 42 or cam wheels 100.

Bearings 248 are press-fit into an opening 244 formed in each cam wheel 100 and an axle 246 is received by bearings 248 and is fixed to a mounting block 250. Mounting blocks 250 are fixed to arms 92, 94 to mount cam wheel assemblies 234, 236 to arms 92, 94.

Arms 92, 94 include a center line 146 bisecting the ends 142, 144 of arms 92, 94 as shown in FIG. 2. Cam wheels 100 are positioned to lie adjacent to center line 146. Cam wheel 100 of leading arm 92 is spaced-apart from center line 146 and is positioned to lie on a side of center line 146 closer to first end 142 of leading arm 92, and cam wheel 100 of trailing arm 94 is spaced-apart from centerline 146 and is positioned to lie on a side of center line 146 closer to second end 144 of trailing arm 94.

Cam wheel 100 of leading cam wheel assembly 234 rotates about an axis of rotation 252 and cam wheel 100 of trailing cam wheel assembly 236 rotates about an axis of rotation 254 as shown in FIGS. 4 and 5. Base 74 includes two sides 78, 80 defining two vertical planes indicated by lines a and b (planes a and b both extend perpendicular to the page in the illustrations) and the vertical planes a and b define a space therebetween containing base 74. Axis of rotation 252 and axis of rotation 254 are both positioned to lie outside of the space defined by planes a and b, both when arms 92, 94 are in the article-engaging position and when arms 92, 94 are in the down-out-of-the-way position as shown in FIGS. 4 and 5. Further, top surface 86 of base 74 defines a horizontal plane indicated by line c (plane c extends perpendicular to the page in the illustrations) and axis of rotation 252 and axis of rotation 254 are both positioned to lie beneath horizontal plane c as shown in FIGS. 4 and 5.

Cam wheels 100 are positioned to ride along parallel wheel guide tracks 42 when carrier 12 is on a portion of upper runs 44 of carrier chains 22 adjacent to wheel guide tracks 42, as shown in FIGS. 1 and 2. When cam wheels 100 ride along a portion of wheel guide tracks 42 having a large vertical gap 114 between upper runs 44 of carrier chains 22 and wheel guide tracks 42, arms 92, 94 are downward and away from lower base 90 in the down-out-of-the-way position as shown in FIG. 5. When cam wheels 100 engage a portion of wheel guide tracks 42 having a small vertical gap 114 between wheel guide tracks 42 and upper runs 44 of carrier chains 22, arms 92 are upward and closer to lower base 90 as shown in FIG. 4. Thus, vertical gap 114 between wheel guide tracks 42 and upper runs 44 of carrier chains 22 determines the position of arms 92, 94 relative to base 74.

Figure 6:
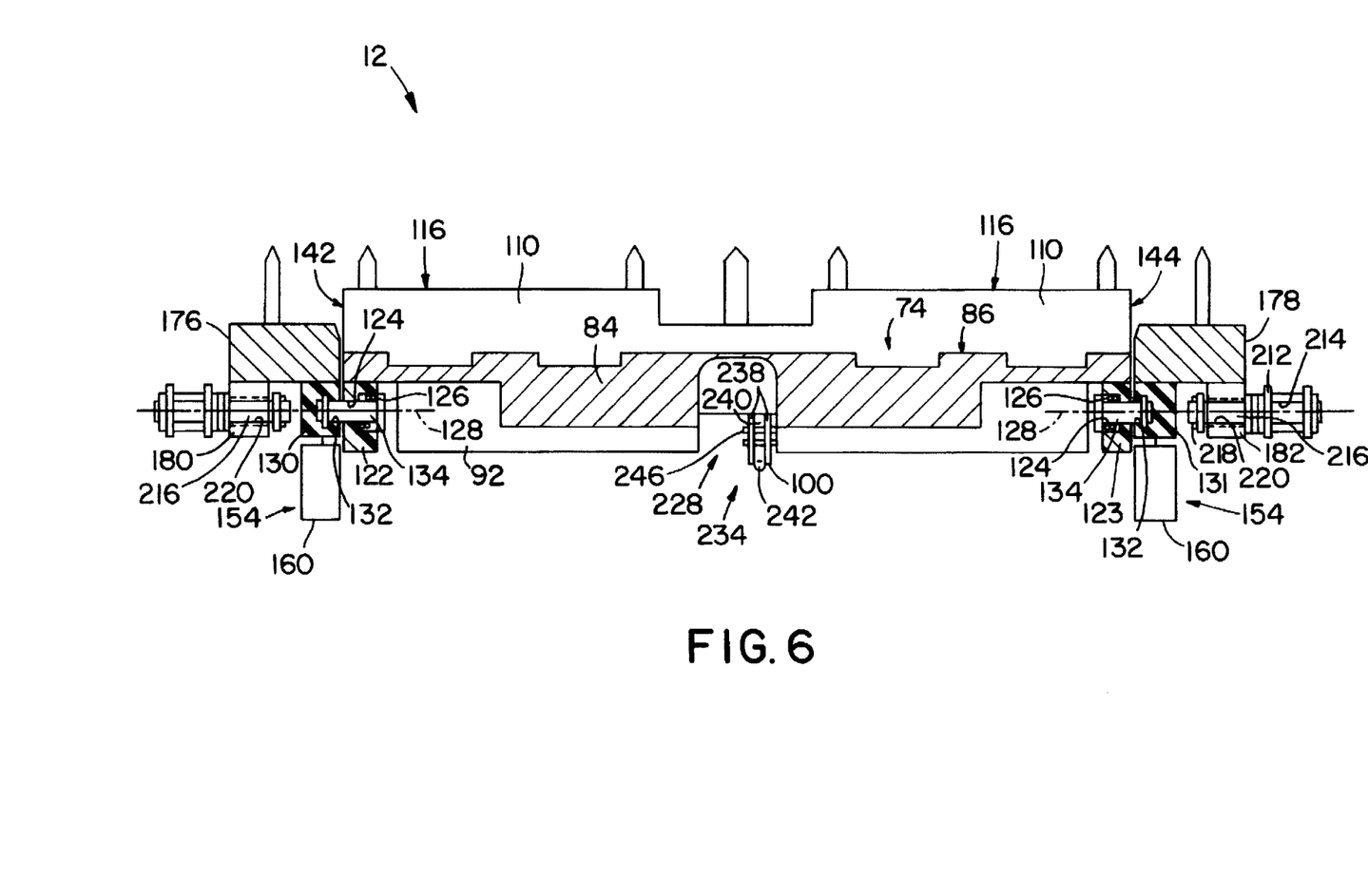
FIG. 6 is a sectional view taken along line 6—6 of FIG. 2 showing two pivot attachment blocks pivotably connected to the leading arm, two attachment plates, one fixed to each pivot attachment block, two chain attachment blocks coupled to the carrier chains, one chain attachment block being fixed to each attachment plate, and a cam wheel connected to the leading arm.

Prongs 122, 123 are pivotably connected to pivot attachment blocks 130, 131 which are connected to base 74 as shown in FIG. 6. Pivot attachment blocks 130, 131 are formed to include openings 132 that receive pivot bolts 134. Proximal portion 96 of each prong 122, 123 includes a pivot bolt-receiving portion 136 that is formed to include an opening 124 as shown in FIGS. 3 and 6. Bearings 126 are received by opening 124, and pivot bolt 134 is received by bearings 126.

First prong 122 of leading arm 92 is connected to first pivot attachment block 130, as shown in FIG. 6, and second prong 123 of leading arm 92 is connected to second pivot attachment block 131. Likewise, first prong 122 of trailing arm 94 is connected to first pivot attachment block 130 and second prong 123 of trailing arm 94 is connected to second pivot attachment block 131. First pivot attachment block 130 is connected to first attachment plate 176 which is connected to first chain attachment block 180 as shown in FIGS. 2 and 6, and second pivot attachment block 131 is connected to second attachment plate 178 which is connected to second chain attachment block 182.

Attachment plates 176, 178 are fixed to chain attachment blocks 180, 182 by bolts 184 that extend through attachment plates 176, 178 as shown in FIG. 2. Chain attachment blocks 180, 182 are coupled to carrier chains 22 by pins 216 as shown in FIG. 6. Elongated base 74 includes two spaced apart longitudinal sides including a leading side 78 and a trailing side 80 and two transverse ends including first end 82 and second end 83. Pivot attachment blocks 130, 131 are connected to transverse ends 82, 83 of base 74 by bolts (not shown) that extend upwardly through pivot attachment blocks 130, 131. An attachment plate 176 is fixed to each pivot attachment block 130, 131, and chain attachment blocks 180, 182 are fixed to each attachment plate 176, as shown in FIGS. 2 and 6.

Each proximal portion 96 of prongs 122, 123 of each arm 92 is further formed to include teeth 150 as shown in FIGS. 3–5. Teeth 150 of first prong 122 of leading arm 92 are arranged to engage teeth 152 of first prong 122 of trailing arm 92 so that teeth 150 interlock and mesh with teeth 152 to provide a gear-like coupling between both arms 92, 94, as shown best in FIGS. 4 and 5. This gear-like coupling prevents arms 92, 94 from engaging in independent pivoting movement relative to one another.

Followers 154 are connected to leading arm 92 and extend downwardly therefrom as shown best in FIGS. 3–5. Followers 154 include a mounting portion 156 connected to arm 92 beneath prongs 122, 123 and a downwardly and inwardly extending section 158 including a tip 160 that engages pivot attachment block 130 when leading arm 92 is in the down-out-of-the-way position, thereby stopping the downward pivoting movement of leading arm 92 and preventing leading arm 92 from moving to a position below the down-out-of-the-way position. The meshing engagement of teeth 150 of leading arm 92 and teeth 152 of trailing arm 94 prevents independent pivoting movement of trailing arm 94 relative to leading arm 92, so that engagement of tip 160 with pivot attachment block 130 halts both the pivoting movement of leading arm 92 and the pivoting movement of trailing arm 94 downwardly away from base 74 when arms 92, 94 reach the down-out-of-the-way position.

Followers 154 are shaped and positioned so that tips 160 engage pivot attachment blocks 130, 131 when leading arm 92 pivots downwardly to achieve a predetermined angle 162 relative to top surface 86 of base 74, as shown in FIG. 5. Teeth 150 and teeth 152 are preferably configured so that trailing arm 94 achieves the same angle relative to top surface 86 as leading arm 92 when arms 92, 94 are in the down-out-of-the-way position.

Chain attachment blocks 180, 182 are mounted to carrier chains 22 for limited movement to permit movement of carrier chains 22 coupled to chain attachment blocks 180, 182 around curves such as when carrier chains 22 move around sprockets 28 of tail shaft assembly 14 and head shaft assembly 18. A coupling between each chain attachment block 180, 182 and a carrier chain 22 includes chain connectors 210 as shown in FIG. 2. Chain connectors 210 include two spaced-apart parallel plates 212 each of which are formed to include two pin-receiving openings 214. Pins 216 are received by pin-receiving openings 214 and are held in pin-receiving openings 214 by clips 218. Chain connectors 210 are spaced apart along carrier chains 22, and each chain attachment block 180, 182 is connected to four pins 216 of two adjacent and spaced apart chain connectors 210 as shown in FIG. 2.

Chain attachment blocks 180, 182 are each formed to include openings 220 to receive pins 216 as shown in FIG. 2. Pins 216 are rotatably received by pin-receiving openings 220 so that each chain attachment block 180, 182 can rotate relative to chain connectors 210 thereby permitting carrier chains 22 to move freely about tail shaft assembly 14 and head shaft assembly 18.

Typically, pins 216 of chain connectors 210 are approximately twice the length of pins 222 connecting linkages 24 of carrier chains 22 as shown in FIG. 2. Each linkage 24 positioned adjacent to a chain connector 210 has pins 222 of carrier chains 22 replaced by pins 216 of chain connectors 210, so that pins 216 extends through both chain connectors 210 and linkages 24 thereby connecting chain connectors 210 to linkages 24.

During the operation of carrier transport mechanism 11, each carrier 12 along lower runs 40 rides against a top surface 42 of a carrier chain feed rail 34 before engaging tail shaft assembly 14 as shown in FIG. 1. As carrier 12 is pulled around tail shaft assembly 14 by carrier chains 22, followers 154 engage a follower guide disks 258 to hold carrier 12 open with arms 92, 94 pivoted to the down-out-of-the-way position, shown in FIG. 1 as carrier 12 is pulled around tail shaft assembly 14.

Once carrier 12 is moved by carrier chains 22 around tail shaft assembly 14, carrier 12 reaches starting position 60 as shown in FIG. 1. There are no wheel guide tracks 42 beneath upper runs 30 at starting position 60, so that arms 92, 94 remain in the down-out-of-the-way position at sweep-in section 64. Article 62 is swept onto base 74 of carrier 12 by a standard overhead sweep mechanism which is well known in the art while arms 92, 94 are in the down-out-of-the-way position at sweep-in section 64. When in the down-out-of-the-way position, top surfaces 116 of walls 110, 112 are below top surface 86 of base 74. This permits an article 62 being swept on to base 74 to be supported from the bottom (not shown) of article 62, thereby allowing article 62 to remain horizontal as it is transferred from the sweeping mechanism to base 74.

As carrier 12 is drawn by carrier chains 22 out of sweep-in section 64 and into operating section 66, cam wheels 100 engage wheel guide tracks 42. As carrier chains 22 pull carrier 12 to operating section 66 in a direction 56 toward head shaft assembly 18, cam wheels 100 roll along wheel guide tracks 42 and vertical gap 114 between wheel guide tracks 42 and carrier chain 22 decreases. As vertical gap 114 decreases, arms 92, 94 are pivoted upwardly to the article-engaging position. When arms 92, 94 are in the article-engaging position, walls 110, 112 envelope article 62 as shown in FIG. 1.

Upwardly-extending locator pins 260 are attached to various surfaces along the periphery of carrier 12 including base 84, walls 110, and attachment plates 176 as shown in FIGS. 1–6. Locator pins 260 ensure that articles 62 are properly positioned in carriers 12. Depending on the shape of article 62, article 62 can engage an article-support surface 148 including the tops of prongs 122, 123, a inner surface of wall 110, and top surface 116 of walls 110, 112, as shown best in FIG. 3. Once arms 92, 94 of carrier 12 are pivoted to the article-engaging position, article 62 is securely held by carrier 12 and operations can be performed on article 62 without article 62 changing its orientation relative to carrier 12 and without article 62 being dropped by carrier 12.

After the operations are completed, carrier chains 22 pull carrier 12 from operating section 66 to sweep-out section 68 and vertical gap 114 between carrier chains 22 and wheel guide tracks 42 increases. Since cam wheels 100 engage and are supported only by wheel guide tracks 42, the weight of arms 92, 94 cause arms 92, 94 to pivot downwardly under the force of gravity as vertical gap 114 increases as shown in FIG. 1, until arms 92, 94 achieve the down-out-of-the-way position. Once arms 92, 94 are in the down-out-of-the-way position with top surfaces 116 of walls 110, 112 below top surface 86 of base 74 so that walls 110, 112 do not obstruct access to base 74, article 62 can be swept out of carrier 12 and conveyor system 10.

Carrier chains 22 then draw carrier 12 to head shaft assembly 18. When carrier chains 22 adjacent to carrier 12 engage head shaft assembly 18, followers 154 engages follower guide disk 258 which supports carrier 12 and holds arms 92, 94 open as carrier 12 and carrier chains 22 travel around head shaft assembly 18. Once carrier chains 22 advance past head shaft assembly 18, followers 154 engage a bottom follower rail 262 to allow smooth closing of carrier 12 as carrier 12 leaves head shaft assembly 18. Carrier chains 22 and carrier 12 move to lower runs 40 of carrier chains 22 and are pulled in direction 58 from head shaft assembly 18 to tail shaft assembly 14. Carrier 12 is supported first by top surface 36 of carrier chain return rails 32 and then by top surface 38 of carrier chain feed rail 34 as shown in FIG. 1.

In preferred embodiments, top surfaces 116 of walls 110, 112 are provided with elongated ridges 186 as shown in FIG. 3. Ridges 186 are advantageous for interfacing article 62 carried by carrier 12 with heat seal equipment (not shown) such as that disclosed in U.S. Pat. No. 4,991,375 to Raque et al. for covering article 62 with covering material (not shown) and forming a seal between article 62 and the covering material.

Article 62 can be a package for containing a product, and article 62 can include a flange (not shown) having a deformable sealing portion (not shown) with a bottom surface that engages ridges 186. As article 62 is carried by carrier 12 through operating section 66, product can be deposited in a space defined by article 62. It is possible while product can be deposited that a small portion of product is inadvertently splashed onto the top surface of deformable sealing portion.

Although such misapplied product would interrupt the formation of a continuous seal between the flange and the covering material, pressure from the heat seal equipment (not shown) deforms flange around ridges 186 so that ridges conforming to ridges 186 are formed in the flange of article 62. Pressure from the heat seal equipment forces the misapplied product into troughs (not shown) between the ridges formed in the flange and a seal can be successfully formed between the covering material and the tops of ridges 186.

Although the invention has been described in detail with reference to a preferred embodiment, variations and modifications exist within the scope and spirit of the invention as described and defined in the following claims.

I claim:

1. A carrier for transporting an article on a carrier transport mechanism of a conveyor system, the carrier comprising a base having two opposing sides and an upwardly-facing top surface defining a plane, a mounting block fixed relative to the base, an arm having a proximal portion pivotably connected to the mounting block and a distal portion supporting a wall having a top surface, means coupled to the base for moving the arm relative to the base between an article-engaging position having the top surface of the wall positioned to lie above the plane defined by the top surface of the base and a down-out-of-the-way position having the top surface of the wall positioned to lie below the plane defined by the top surface of the base, an attachment plate fixed to the mounting block, and a chain attachment block fixed to the attachment plate, the chain attachment block being coupled to a carrier transport mechanism of a conveyer system.

2. The carrier of claim 1, wherein the arm is positioned to lie beneath the base and the wall extends upwardly therefrom.

3. The carrier of claim 2, wherein the arm further includes a middle section positioned to lie between the proximal portion and the distal portion and the middle section of the arm is spaced apart from the base when the wall is in the down-out-of-the-way position.

4. The carrier of claim 1, wherein the base is elongated and the wall is positioned to lie adjacent to a longitudinal side of the base when the arm is in the article-engaging position.

5. The carrier of claim 4, wherein the arm is pivotably coupled to the base and is arranged to pivot about a pivot axis that is parallel to the longitudinal side of the base.

6. The carrier of claim 5, wherein the pivot axis is positioned to lie beneath the plane defined by the top surface of the base.

7. The carrier of claim 1, wherein the arm includes a cam wheel arranged to engage the conveyor system, the cam wheel cooperating with the conveyor system to position the wall relative to the base.

8. A carrier for transporting an article on a carrier transport mechanism of a conveyor system, the carrier comprising a base having two opposing sides and an upwardly-facing top surface defining a plane, a first arm having a proximal portion coupled to the base and a distal portion supporting a first wall extending upwardly from the first arm and having a top surface, means coupled to the base for moving the first arm relative to the base between an article-engaging position having the top surface of the first wall positioned to lie above the plane defined by the top surface of the base and a down-out-of-the-way position having the top surface of the first wall positioned to lie below the plane defined by the top surface of the base, a second arm opposing the first arm and having a proximal portion coupled to the base and a distal portion supporting a second wall extending upwardly from the second arm and having a top surface, means coupled to the base for moving the second arm relative to the base between an article-engaging position having the top surface of the second wall positioned to lie above the plane defined by the top surface of the base and a down-out-of-the-way position having the top surface of the second wall positioned to lie below the plane defined by the top surface of the base, and a first set of teeth appended to the proximal portion of the first arm, a second set of teeth appended to the proximal portion of the second arm, the teeth of the first arm engage the teeth of the second arm to prevent independent movement of the first arm relative to the second arm.

9. The carrier of claim 8, further comprising means interposed between the first arm and the second arm for causing movement of the first arm to depend upon movement of the second arm.

10. The carrier of claim 8, wherein both of the first and second arms are positioned to lie beneath the plane defined by the top surface of the base.

11. The carrier of claim 8, wherein the base is elongated and the first wall is positioned to lie adjacent to a first longitudinal side of the base when the first wall is in the article-engaging position and the second wall is positioned to lie adjacent to a second longitudinal side of the base when the second wall is in the article-engaging position.

12. A carrier coupled to a carrier transport mechanism of a conveyor system for transporting an article, the carrier comprising an elongated base having two spaced-apart longitudinal sides, two spaced-apart ends therebetween, and a top surface arranged to carry the article, a first U-shaped arm supporting a first wall, a second U-shaped arm supporting a second wall spaced-apart and parallel to the first wall, the first arm having a first bar integrally appended to the first wall and having a first prong and a second prong integrally appended to the first bar, the first prong of the first arm and the second prong of the first arm are spaced apart and extend toward the second arm in a direction perpendicular to the first wall, the second arm having a second bar integrally appended to the second wall and having a first prong and a second prong integrally appended to the second bar, the first prong of the second arm and the second prong of the second arm are spaced apart and extend toward the first arm in a direction perpendicular to the second wall, the first arm is pivotably coupled to the base and is arranged to pivot about a first pivot axis that intersects both prongs of the first arm and the second arm is pivotably coupled to the base and is arranged to pivot about a second pivot axis that intersects both prongs of the second arm such that the first wall and the second wall are movable to a first position adjacent to the article to restrain movement of the article past the spaced-apart longitudinal sides of the base and a second position away from the article.

13. The carrier of claim 12, further comprising a first block and a second block, wherein the first prong of the first arm is pivotably coupled to the first block, the first prong of the second arm is pivotably coupled to the first block, the second prong of the first arm is pivotably coupled to the second block, the second prong of the second arm is pivotably coupled to the second block, and the first and second blocks are coupled to the carrier transport mechanism.

14. The carrier of claim 12, wherein the walls have elongated top surfaces that are formed to include elongated ridges.

15. A carrier coupled to a carrier transport mechanism of a conveyor system for transporting an article, the carrier comprising an elongated base having two spaced-apart longitudinal sides, two spaced-apart ends therebetween, and a top surface arranged to carry the article, a first U-shaped arm supporting a first wall, a second U-shaped arm supporting a second wall spaced-apart and parallel to the first wall, the first arm having a first bar integrally appended to the first wall and having a first prong and a second prong integrally appended to the first bar, the first prong of the first arm and the second prong of the first arm are spaced apart and extend toward the second arm in a direction perpendicular to the first wall, the second arm having a second bar integrally appended to the second wall and having a first prong and a second prong integrally appended to the second bar, the first prong of the second arm and the second prong of the second arm are spaced apart and extend toward the first arm in a direction perpendicular to the second wall, a first block and a second block, wherein the first prong of the first arm is pivotably coupled to the first block, the first prong of the second arm is pivotably coupled to the first block, the second prong of the first arm is pivotably coupled to the second block, the second prong of the second arm is pivotably coupled to the second block, and the first and second blocks are coupled to a carrier transport mechanism of a conveyor system, the first block is connected to the base, the second block is connected to the base, and the first and second blocks are arranged so that the prongs of the first arm and the prongs of the second arm are positioned to lie beneath the top surface of the base, and the first wall and the second wall are movable to a first position adjacent to the article to restrain movement of the article past the longitudinal sides of the base and a second position away from the article.

16. A carrier for carrying an article as the article and the carrier are transported by a carrier transport mechanism of a conveyor system, the carrier comprising a base having a top surface that defines a horizontal plane, a first arm having a distal portion and a proximal portion, the proximal portion of the first arm being pivotably coupled to the base, a first cam wheel rotatably connected to the distal portion of the first arm and arranged to engage a portion of a conveyor system that is fixed relative to the carrier, the first cam wheel cooperating with the portion of the conveyor system to position the first arm relative to the base, the first arm pivots about a first pivot axis, the first cam wheel rotates about a first axis of rotation, and the first pivot axis is parallel to the first axis of rotation, and the first arm pivots between a first position having the first pivot axis the same vertical distance from the horizontal plane as the first axis of rotation and a second position having the first axis of rotation a larger vertical distance form the horizontal plane than the first pivot axis.

17. The carrier of claim 16, wherein the base is formed to include two spaced-apart parallel sides, each side defining a vertical plane, the two vertical planes defining a space therebetween containing the base, and the first cam wheel axis of rotation positioned to lie outside of the space defined by the two vertical planes.

18. The carrier of claim 16, wherein the first cam wheel axis of rotation is positioned to lie below the horizontal plane defined by the top surface of the base.

19. The carrier of claim 16, wherein the first arm includes two spaced-apart ends between the proximal portion of the first arm and the distal portion of the first arm and a middle portion that is positioned to lie between the two spaced-apart ends of the first arm, and a portion of the first cam wheel is positioned to lie within the middle portion of the first arm.

20. The carrier of claim 19, wherein the first arm includes a center line bisecting the two spaced-apart ends of the first arm and the first cam wheel is spaced-apart from the center line of the first arm.

21. The carrier of claim 16, further comprising a second arm having a distal portion and a proximal portion, the proximal portion of the second arm being pivotably coupled to the base, and a second cam wheel rotatably connected to the distal portion of the second arm and arranged to engage a portion of the conveyor system that is fixed relative to the carrier, the second cam wheel cooperating with the portion of the conveyor system to position the second arm relative to the base.

22. The carrier of claim 21, wherein the first arm has a proximal portion, a distal portion, two spaced-apart ends of the first arm therebetween, and a middle portion that is positioned to lie between the two spaced-apart ends and is spaced apart from both of the two spaced-apart ends of the first arm, the second arm has a proximal portion, a distal portion, two spaced-apart ends therebetween, and a middle portion that is positioned to lie between the two spaced-apart ends of the second arm and is spaced apart from both of the two spaced-apart ends of the second arm, a portion of the first cam wheel is positioned to lie within the middle portion of the first arm, and a portion of the second cam wheel is positioned to lie within the middle portion of the second arm.

23. The carrier of claim 21, wherein the carrier includes a first center line bisecting the spaced-apart ends of the first arm, a second center line bisecting the spaced-apart ends of the second arm, and the first cam wheel is spaced-apart from the first center line and the second cam wheel is spaced apart from the second center line.

24. The carrier of claim 23, wherein the first center line is parallel with the second center line and the first cam wheel is positioned to lie on one side of the first and second center lines and the second cam wheel is positioned to lie on an opposing side of the first and second center lines.

25. A conveyor system for transporting articles past equipment that can perform operations on the articles, the conveyor system comprising a frame, a carrier-transport mechanism connected to the frame and positioned to lie adjacent to the equipment, a carrier coupled to the carrier-transport mechanism, the carrier including a base and an arm pivotably coupled to the base, a wheel guide track fixed relative to the frame and positioned to lie adjacent to the carrier-transport mechanism so that the arm of the carrier engages the wheel guide track, and the wheel guide track including a ramping portion configured so that calming engagement of the arm and the ramping portion causes the arm to move relative to the base as the carrier moves relative to the ramping portion, the ramping portion being positioned to lie beneath the carrier and the arm pivots downwardly away from the base under the force of gravity as the carrier moves relative to the ramping portion.

26. The conveyor system of claim 25, wherein the carrier-transport mechanism includes an upper run and the wheel guide track is spaced apart from the upper run of the carrier transport mechanism to form a gap therebetween, the wheel guide track being positioned to lie beneath the upper run.

27. The conveyor system of claim 26, wherein the carrier cooperates with the carrier-transport mechanism to carry articles when the carrier is positioned on the upper run of the carrier-transport mechanism and the arm engages the wheel guide track when the carrier is on the upper run of the carrier-transport mechanism.

28. The conveyor system of claim 26, wherein the conveyor system includes a plurality of laterally spaced-apart positions located adjacent to the upper run and the wheel guide track and the upper run are configured so that the magnitude of the gap between the upper run and the wheel guide track adjacent to one position is different from the magnitude of the gap between the upper run and the wheel guide track adjacent to at least one other position.

29. A conveyor system for transporting articles past equipment that can perform operations on the articles, the conveyor system comprising a frame, a carrier-transport mechanism connected to the frame and positioned to lie adjacent to the equipment, a carrier coupled to the carrier-transport mechanism, the carrier including a base, a first arm pivotably coupled to the base, and a second arm pivotably coupled to the base, a first wheel guide track fixed relative to the frame and positioned to lie adjacent to the carrier-transport mechanism so that the first arm of the carrier engages the first wheel guide track, and a second wheel guide track fixed relative to the frame and positioned to lie adjacent to the carrier-transport mechanism so that the second arm of the carrier engages the second wheel guide track.

30. The conveyor system of claim 29, wherein the first arm includes a first portion that engages the first wheel guide track, the second arm includes a second portion that engages the second wheel guide track, the second wheel guide track is parallel to the first wheel guide track, and the second wheel guide track is longitudinally spaced-apart from the first wheel guide track a distance equal to the distance on the carrier between the first portion and the second portion.

31. A carrier for carrying an article being transported on a carrier transport mechanism of a conveyor system, the carrier comprising a base having a top and two spaced-apart sides, a first arm coupled to the base for pivoting movement about a first pivot axis, and a second arm opposing the first arm, the second arm being coupled to the base for pivoting movement about a second pivot axis, the first pivot axis being parallel to the second pivot axis and the first and second pivot axes being positioned to lie between the two sides of the base and below the top of the base, means appended to the first and second arms for preventing independent movement of the first arm relative to the second arm, means appended to the first arm for stopping pivoting movement of the first arm downwardly away from the top surface of the base when the first arm is a predetermined distance away from the top surface of the base.

32. A carrier for carrying an article being transported on a carrier transport mechanism of a conveyor system, the carrier comprising a base having a top and two spaced-apart sides, a first arm coupled to the base for pivoting movement about a first pivot axis, and a second arm opposing the first arm, the second arm being coupled to the base for pivoting movement about a second pivot axis, the first pivot axis being parallel to the second pivot axis and the first and second pivot axes being positioned to lie between the two sides of the base and below the top of the base, a first set of teeth appended to the first arm and a second set of teeth appended to the second arm, the second teeth engage the first teeth to prevent independent movement of the first arm relative to the second arm.

33. The carrier of claim 32, further comprising a block connected to the carrier and a follower connected to the first arm, the follower including a tip that engages the block to stop the movement of the first arm downwardly away from the top surface of the base when the first arm has pivoted to a predetermined angle relative to the top surface of the base.

34. The carrier of claim 31, wherein the first arm has an elongated top surface formed to include elongated ridges and the second arm has a top surface formed to include elongated ridges.

35. The carrier of claim 34, wherein the article is a product-filled container having a deformable sealing portion and the ridges support an underside of deformable sealing portion during a heat seal operation.

* * * * *